(12) United States Patent
Saggin

(10) Patent No.: US 12,070,834 B2
(45) Date of Patent: Aug. 27, 2024

(54) GRINDING MACHINE

(71) Applicant: SALVAGNINI ITALIA S.P.A., Sarego (IT)

(72) Inventor: Stefano Saggin, Schio (IT)

(73) Assignee: SALVAGNINI ITALIA S.P.A., Sarego (IT)

(*) Notice: Subject to any disclaimer, the term of this patent is extended or adjusted under 35 U.S.C. 154(b) by 1339 days.

(21) Appl. No.: 16/608,933

(22) PCT Filed: Apr. 27, 2018

(86) PCT No.: PCT/IT2018/050078
§ 371 (c)(1),
(2) Date: Oct. 28, 2019

(87) PCT Pub. No.: WO2018/198151
PCT Pub. Date: Nov. 1, 2018

(65) Prior Publication Data
US 2020/0180102 A1 Jun. 11, 2020

(30) Foreign Application Priority Data
Apr. 28, 2017 (IT) .......................... 102017000046674

(51) Int. Cl.
B24B 41/06 (2012.01)
B23Q 1/25 (2006.01)
(Continued)

(52) U.S. Cl.
CPC .............. B24B 41/066 (2013.01); B24B 3/00 (2013.01); B24B 41/06 (2013.01); B24B 51/00 (2013.01); B23Q 1/25 (2013.01); B23Q 3/04 (2013.01)

(58) Field of Classification Search
CPC .. B24B 3/00; B24B 3/02; B24B 3/065; B24B 3/10; B24B 3/24; B24B 3/247;
(Continued)

(56) References Cited

U.S. PATENT DOCUMENTS 3,365,843 A    1/1968  Robinson
4,575,969 A *  3/1986  Klingel .................... B24B 7/16
                                                    451/285

(Continued)

FOREIGN PATENT DOCUMENTS

CN         2848464     12/2006
CN       101780652      7/2010
(Continued)

OTHER PUBLICATIONS

International Search Report issued Jul. 27, 2018 in International (PCT) Application No. PCT/IT2018/050078.
(Continued)

Primary Examiner — Makena S Markman
(74) Attorney, Agent, or Firm — Wenderoth, Lind & Ponack, L.L.P.

(57) ABSTRACT

A grinding machine for grinding tools comprises a support unit configured to support a tool to be ground and provided with members suitable to incline it by certain angle with respect to a horizontal reference plane; and an operating unit that is mobile along a main axis of development of the grinding machine in order to move with respect to the support unit and comprises an abrasive element intended to abrade at least a portion to be ground of the tool. The grinding machine comprises an adjustment system to adjust the inclination of the support unit with respect to the reference plane. The adjustment means system is mobile parallel to the main axis of development to move to a predetermined distance from the reference plane.

7 Claims, 3 Drawing Sheets

(51) Int. Cl.
  *B23Q 3/04* (2006.01)
  *B24B 3/00* (2006.01)
  *B24B 51/00* (2006.01)

(58) Field of Classification Search
  CPC .... B24B 3/28; B24B 3/30; B24B 3/34; B24B 3/36; B24B 3/60; B24B 5/04; B24B 5/047; B24B 7/04; B24B 19/04; B24B 19/16; B24B 19/27; B24B 27/0015; B24B 27/0046; B24B 27/0053; B24B 41/06; B24B 41/005; B24B 41/02; B24B 41/066; B24B 41/067; B24B 47/22; B24B 47/26; B24B 49/00; B24B 49/02; B24B 49/04; B24B 51/00; B24B 53/005; B24B 53/02; B24B 53/06; B24B 53/065; B24B 53/067; B24B 53/07; B24B 53/075; B24B 53/08; B24B 53/083; B24B 53/085; B23Q 1/25; B23Q 3/04
  USPC .... 451/5, 9, 10, 11, 12, 14, 45, 48, 56, 143, 451/144, 278, 279, 282, 285, 293, 294, 451/342, 349, 365, 369, 374, 375, 376, 451/379, 380, 387, 397, 398, 405, 443
  See application file for complete search history.

(56) References Cited

U.S. PATENT DOCUMENTS

| | | | |
|---|---|---|---|
| 6,123,611 | A | 9/2000 | Lawrence, Jr. |
| 7,852,031 | B2 | 12/2010 | Hon et al. |
| 10,092,994 | B2 | 10/2018 | Junker |
| 2004/0185752 | A1 | 9/2004 | Han |
| 2008/0156125 | A1 | 7/2008 | Brand et al. |
| 2009/0033271 | A1 | 2/2009 | Hon et al. |
| 2014/0302751 | A1 | 10/2014 | Junker |

FOREIGN PATENT DOCUMENTS

| | | |
|---|---|---|
| CN | 102935604 | 2/2013 |
| CN | 203863470 | 10/2014 |
| CN | 104476357 | 4/2015 |
| CN | 106002661 | 10/2016 |
| DE | 1 577 457 | 4/1970 |
| DE | 10 2005 020 034 | 11/2006 |
| JP | 49-30995 | 3/1974 |
| JP | 57-163046 | 10/1982 |
| JP | 59-134645 | 8/1984 |
| JP | 7-237097 | 9/1995 |
| JP | 2002-113657 | 4/2002 |
| RU | 2605399 | 12/2016 |
| SU | 1135623 | 1/1985 |

OTHER PUBLICATIONS

Office Action issued Feb. 2, 2021 in corresponding Japanese Patent Application No. 2019-558707, with English Translation.
Office Action issued Feb. 9, 2021 in corresponding Chinese Patent Application No. 201880041421.5, with English Translation.
Office Action issued Oct. 9, 2021 in corresponding Chinese Patent Application No. 201880041421.5, with English-language translation.
Russian First Office Action issued May 18, 2020 in corresponding Russian Patent Application No. 2019137726 with English translation.

* cited by examiner

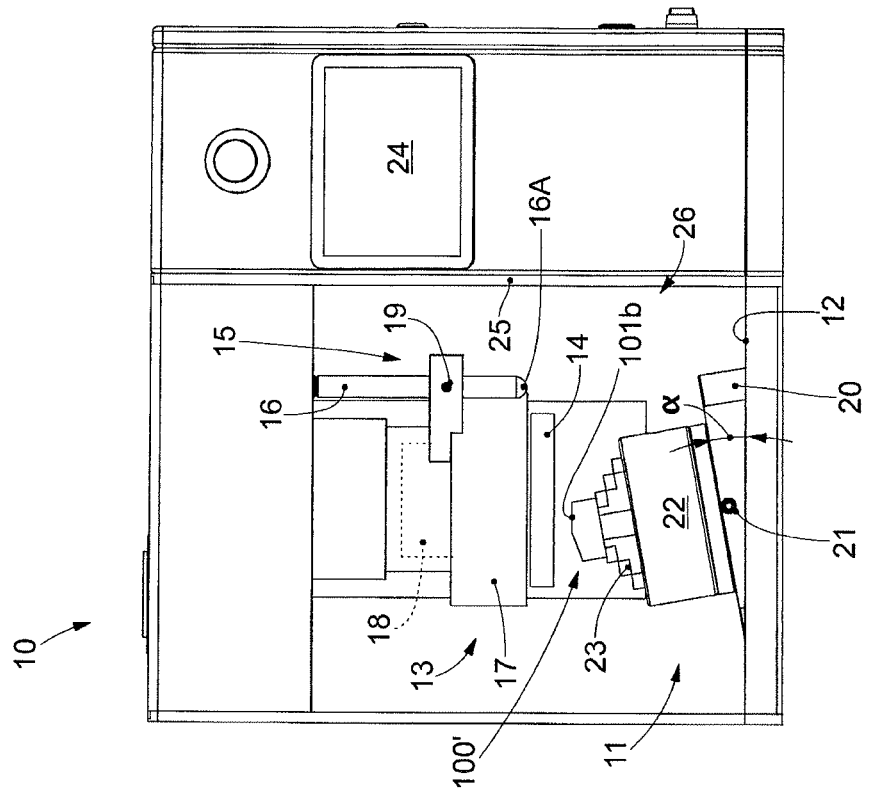
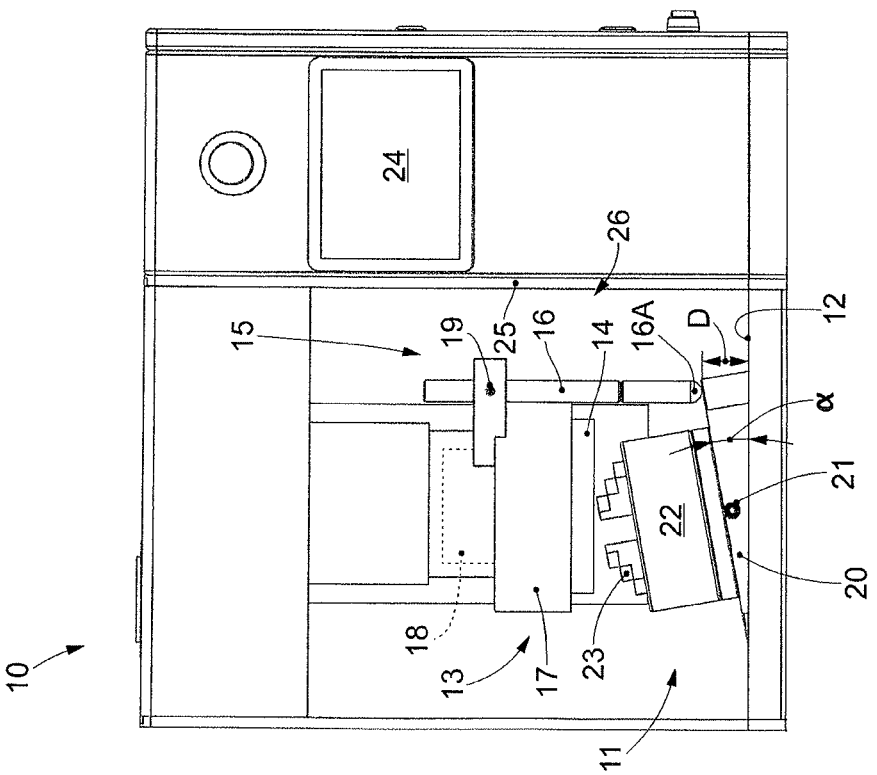

GRINDING MACHINE

FIELD OF THE INVENTION

The present invention concerns a grinding machine, in particular to grind tools for working sheet metal, for example to perform punching operations on them.

BACKGROUND OF THE INVENTION

Grinding machines are known in the state of the art which are commonly used to grind and regenerate, after use cycles, the cutting edge of a tool. In particular, the grinding operation of the tools is necessary when the cutting edge is even only partly worn due to use and is therefore no longer able to correctly cut the sheet metal.

In the state of the art, very large and cumbersome grinding machines are known, of the horizontal bench type, which are generally used in centers and areas dedicated to the restoration and regeneration of tools, where the tools to be regenerated are brought to perform these operations.

In recent times, however, more compact and simplified grinding machines have become more widespread, which are used in the same areas and by the same operators who then use the tools in the work to be carried out. Therefore, the need has developed to produce machines with extremely simple structure and functioning, which allow operators who are not specialized in specific operations to restore and regenerate tools to perform these activities in a short time and without requiring particular expertise and attention.

Such grinding machines generally comprise a grinding tool of the vertically descending rotary type.

Typically, the grinding tool may be a rotating abrasive wheel able to remove material in correspondence with the cutting edge of the tool to remove the worn portion and thus regenerate the cutting edge.

These grinding machines also comprise a vice or mandrel of the universal type, able to hold the tool to be ground.

In this type of machine, the abrasive wheel is rotatable around a vertical axis of rotation and is also mobile along this axis to move closer to, or away from, the tool-bearing mandrel.

During use, the tool-bearing mandrel descends along the vertical axis until it comes into contact with the tool to be ground. To grind the cutting edge of the tool, the abrasive wheel and the tool-bearing mandrel can both be made to rotate, in particular with opposite directions of rotation. Once the abrasion process has been completed, the abrasive wheel re-ascends along the vertical axis to move away from the ground tool and allow the operator to remove it.

The tools to be ground can comprise a great variety of types.

In particular, in sheet metal punching operations, tools are very often used with a cutting portion inclined with respect to the horizontal. These tools are very commonly used as they allow to obtain an improved surface quality of the surfaces worked and also increase the working life of the tool. Moreover, these tools allow to reduce the cutting effort and the noise generated during processing.

In grinding machines known in the state of the art, the tool-bearing mandrel is disposed on a rotary table. When tools are to be ground with the cutting portion inclined, the rotary table and the tool-bearing mandrel are normally inclined with respect to the horizontal plane by an angle equal to the angle of the tool to be ground. In this way, since the tool-bearing mandrel is inclined, the cutting edge is substantially parallel to a horizontal plane.

Thanks to the inclination of the rotary table and the tool-bearing mandrel, it is possible to take the cutting edge of the tool into the correct position so that the abrasive wheel can correctly grind this type of tool as well.

In grinding machines known in the state of the art, the rotary table is inclined manually by an operator, for example with the aid of a measuring instrument, such as a goniometer or a graduated scale. In this case, the operator inclines the rotary table, after having released it manually, until he/she can read on the measuring instrument an angle equal to the angle of the tool, in such a way as to incline the table by the same angle.

One disadvantage of this solution is that the inclination of the table is inaccurate. In fact, the correct inclination of the table depends mainly on the manual skills of the operator. An imprecise adjustment can cause an incorrect inclination of the table, that is, in which the rotary table is inclined by an angle other than the angle of the tool. In this case, the tool is not ground in an optimal way because it does not affect the cutting edge homogeneously. In fact, some zones of the cutting edge may be ground too much, while other zones of the cutting edge may be ground too little, with the result that the grinding operation has a reduced effectiveness.

Another disadvantage of this solution is that the inclination of the table is laborious and requires a capable operator and a considerable amount of time. It is evident that this is particularly disadvantageous if we consider that every time it is necessary to grind a tool with an angle different from that of the tools ground previously, it takes a long time to set the machine, due to the operations that the operator must perform in order to adjust the inclination of the rotary table.

Solutions exist in the state of the art in which the angle of inclination of the cutting edge can be "copied" to incline the table in a corresponding manner. This solution has the limit that it is not possible to incline the table by a desired angle that does not correspond to the angle of the cutting edge, for example to modify, in the course of subsequent processing cycles, the angle of the cutting edge.

DE 10 2005 020034 A1 and JP 2002 113657 A describe solutions of grinding machines in which the support table of the tool to be ground can be inclined and clamped in a desired angled state.

One purpose of the present invention is to make available a grinding machine of the compact and vertical type discussed above, which has improved performances compared to those known in the state of the art, while still maintaining extreme simplicity, speed and practicality of use.

Another purpose of the present invention is to make available a grinding machine able to effectively grind also cutting tools having cutting portions inclined by a certain angle with respect to the horizontal.

Another purpose of the present invention is to make available a grinding machine in which it is possible to adjust the inclination of a tool support unit precisely and accurately.

Another purpose of the present invention is to make available a grinding machine in which it is possible to adjust the inclination of the tool support unit quickly and simply.

Another purpose of the present invention is to provide a method to effectively grind tools with a cutting portion inclined by a certain angle with respect to the horizontal.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, according to the invention, a grinding machine is made available to grind tools comprising a support unit configured to support a tool to be ground, located on a substantially horizontal reference plane and comprising members suitable to incline the support unit by a certain angle with respect to the reference plane.

The grinding machine also comprises an operating unit comprising abrasive means intended to abrade at least a portion to be ground of the tools. In some embodiments, the abrasive means can be configured as a rotating wheel made of abrasive material.

The operating unit is mobile along a main axis of development of the grinding machine, substantially perpendicular to the reference plane, in order to move, in particular nearer to or farther away from the support unit.

The grinding machine comprises adjustment means to adjust the inclination of the support unit with respect to the reference plane.

The adjustment means are mobile in a parallel manner to the main axis of development to reach a predetermined distance from the reference plane.

In some embodiments, the adjustment means are associated with the operating unit.

In other embodiments, the adjustment means are separate from the operating unit. For example, in one embodiment, the adjustment means can be associated with a wall of the operating chamber in which the operating unit and the support unit are located. Alternatively, the adjustment means can be connected to the reference plane and can be mobile, in a vertical or horizontal direction, in order to move to said distance from the reference plane.

In some embodiments, the adjustment means comprise an adjustment element, for example an oblong element such as a rod, that extends in a direction parallel to the main axis of development.

In some embodiments, the operating unit comprises a support body that supports the abrasive means and the adjustment element, and drive means configured to command the movement of the support body along the main axis of development and/or the rotation movement of the abrasive means around the main axis of development.

In some embodiments, the adjustment element is mobile with respect to the support body.

In some embodiments, a drive unit can be provided that commands the displacement of the adjustment element in a direction parallel to the main axis of development.

In some embodiments of the invention, the operating unit comprises clamping means configured to alternately clamp or release the position of the adjustment element with respect to the support body.

In some embodiments, the support unit comprises abutment means configured to abut on the adjustment element.

In some embodiments, the adjustment element comprises a lower end portion shaped so as to define a localized contact zone between the adjustment element and the abutment means.

In some embodiments, the main axis of development extends in a substantially vertical direction that is transverse, in particular perpendicular, to the reference plane.

According to the invention, a method is also provided for grinding tools using a grinding machine, in particular a grinding machine according to the invention comprising the steps of:

- positioning on the support unit a tool having a cutting portion inclined by a certain angle of inclination with respect to the horizontal,
- introducing in a user interface associated with the machine the value of an angle, that can be equal to or different from the angle of inclination of the cutting portion,
- calculating a distance between adjustment means and a reference plane, wherein the distance is a linear distance corresponding univocally to said angle,
- moving an operating unit comprising abrasive means toward a support unit of the tool by a predetermined quantity which is a function of said distance,
- taking the adjustment means to said distance from the reference plane,
- inclining the support unit by said angle with respect to the reference plane until abutment means comprised in the support unit abut on a lower portion of an adjustment element comprised in the adjustment means,
- distancing the adjustment means from the reference plane so that they do not obstruct the action of the abrasive means,
- grinding the tool using the abrasive means.

In some embodiments, the method according to the invention provides to clamp/unclamp the position of the adjustment element with respect to a support body of the operating unit.

Thanks to the grinding machine and the grinding method according to the invention, it is possible to grind efficiently and precisely tools having a cutting portion inclined by a certain angle with respect to the horizontal, taking the support unit into an inclined position corresponding to said angle of the inclined portion.

It is also possible to incline the support unit by any angle whatsoever, even different from that of the inclined cutting portion.

Thanks to the adjustment means, the grinding machine and the method according to the invention allow to adjust quickly and simply the inclination of the support unit that supports the tool to be ground.

According to another aspect of the invention, a method is provided to command the functioning of a grinding machine to grind tools that comprises the step of controlling the displacement of the operating unit carrying the abrasive means with respect to the support unit of the tool to be ground.

In particular, the method provides to control the speed of displacement of the operating unit along a main axis of development of the grinding machine.

The method provides to detect the force between the tool that is subjected to grinding and the abrasive means, and to command the advance of the operating unit as a function of the value of the force detected. It should be noted that the force between the tool and the abrasive means is a function both of the characteristics of the tool (in particular its geometry and the material of which it is made), and also the contact area between the tool and the abrasive means during the grinding process.

In particular, the step of detecting the force comprises the step of detecting the current absorbed by drive means comprised in the grinding machine and configured to command the displacement of the operating unit (in particular its support body to which the abrasive means are connected)

along the main axis of development and/or the rotation movement of the abrasive means around the main axis of development.

After the step of detecting the current, it is provided to compare the values detected with at least one predetermined threshold value.

After the comparison step, it is provided to decrease, or annul, the speed of advance of the operating unit if the current values detected are higher than said threshold value.

Thanks to this aspect of the invention it is possible to control efficiently the grinding operation of a tool.

One advantage of this aspect of the invention is that the abrasive means always act on different portions of the cutting edge of the tool with the correct force. In this way it is possible to extend the working life of the abrasive means because if they acted with excessive force on the tool to be ground, the abrasive means would be rapidly worn and would have to be replaced very frequently.

BRIEF DESCRIPTION OF THE DRAWINGS

These and other characteristics of the present invention will become apparent from the following description of some embodiments, given as a non-restrictive example with reference to the attached drawings wherein:

FIGS. 2-4 are views in front elevation of the grinding machine of FIG. 1, in which the machine is shown in different successive positions;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants. With reference to FIGS. 1-4, a grinding machine 10 is described for grinding tools 100, 100' provided with at least one cutting portion 101. In particular, the grinding machine 10 is able to grind tools 100, 100' having a cutting portion 101 inclined by a certain angle with respect to the horizontal.

Figure 6:
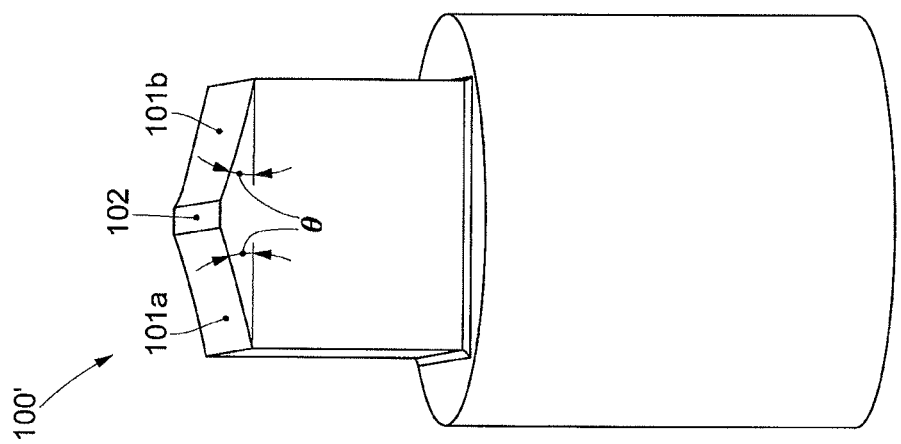
FIGS. 5 and 6 are perspective views of two tools suitable to be ground by a grinding machine according to the invention.
Figure 5:
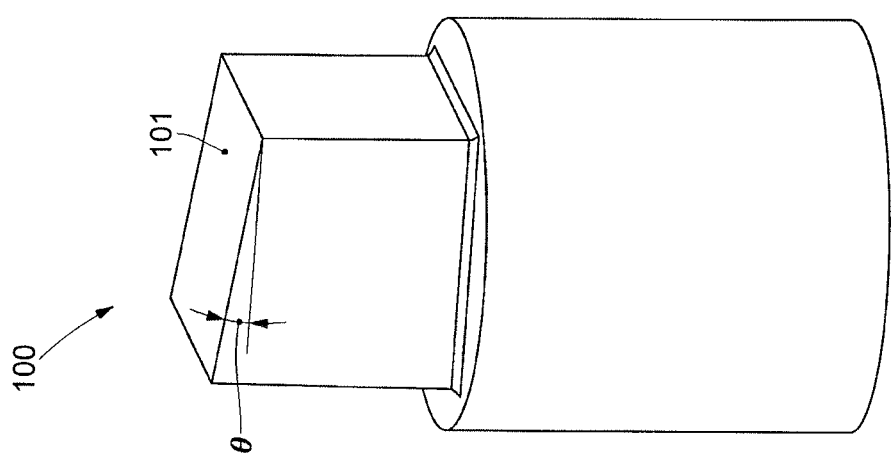

FIGS. 5 and 6 show two different examples of a tool 100, 100' suitable to be ground by a grinding machine 10 according to the invention. FIG. 5 shows a tool 100 having a single cutting portion 101 inclined by an angle of inclination $\theta$ with respect to the horizontal. FIG. 6 shows instead a tool 100' having two cutting portions 101a and 101b, which are joined in correspondence with a top 102 of the tool 100'. Both cutting portions 101a, 101b are inclined by an angle of inclination $\theta$ with respect to the horizontal. In FIG. 4, the tool 100' is shown positioned in position on the grinding machine 10 in order to be ground.

The grinding machine 10 comprises a support unit 11 configured to support one or more tools 100, 100' to be ground.

The support unit 11 is located on a substantially horizontal reference plane 12.

The support unit 11 comprises members, of a known type and not shown, suitable to incline the support unit 11 by a certain angle $\alpha$ (visible in FIGS. 3 and 4) with respect to the reference plane 12. These members can be typically enclosed inside the support unit 11 and can comprise mechanical elements such as for example toothed wheels, a screw-female screw connection, etc. It should be noted that the angle $\alpha$ by which the support unit 11 is inclined can be equal to or different from the angle of inclination $\theta$ of the cutting portion 101, 101a, 101b of the tool 100.

The grinding machine 10 also comprises an operating unit 13 comprising abrasive means 14 intended to abrade at least a portion 101 to be ground of the tools.

The operating unit 13 is mobile along a main axis of development X of the grinding machine 10 so as to move with respect to the support unit 11, in particular to move nearer to or away from it.

In some embodiments, the main axis of development X extends along a substantially vertical direction which is transverse, in particular perpendicular, to the reference plane 12. In these embodiments, the grinding machine 10 is of a vertical type so that the main axis of development X can be disposed vertical.

The operating unit 13 comprises a support body 17 which supports the abrasive means 14.

The operating unit 13 comprises drive means 18 configured to command the displacement of the support body 17 along the main axis of development X.

In some embodiments, the drive means 18 are configured to also allow a rotary movement of the abrasive means 14 around the main axis of development X.

In other embodiments, a device can be provided to rotate the abrasive means 14 which is not located on the operating unit 13.

In some embodiments, the drive means 18 can comprise an electric motor.

In some embodiments, position transducer means are provided, such as for example an encoder of the known type, which are associated with the drive means 18 to know the position of the operating unit 13 so as to suitably drive the drive means 18.

The grinding machine 10 comprises adjustment means 15 to adjust the inclination of the support unit 11 with respect to the reference plane 12.

In some embodiments, the adjustment means 15 can be associated with the operating unit 13.

In other embodiments, the adjustment means 15 can be associated with a wall 25 of the grinding machine 10 which delimits an operating chamber 26 of the machine in which the operating unit 13 and the support unit 11 are located.

Figure 2:
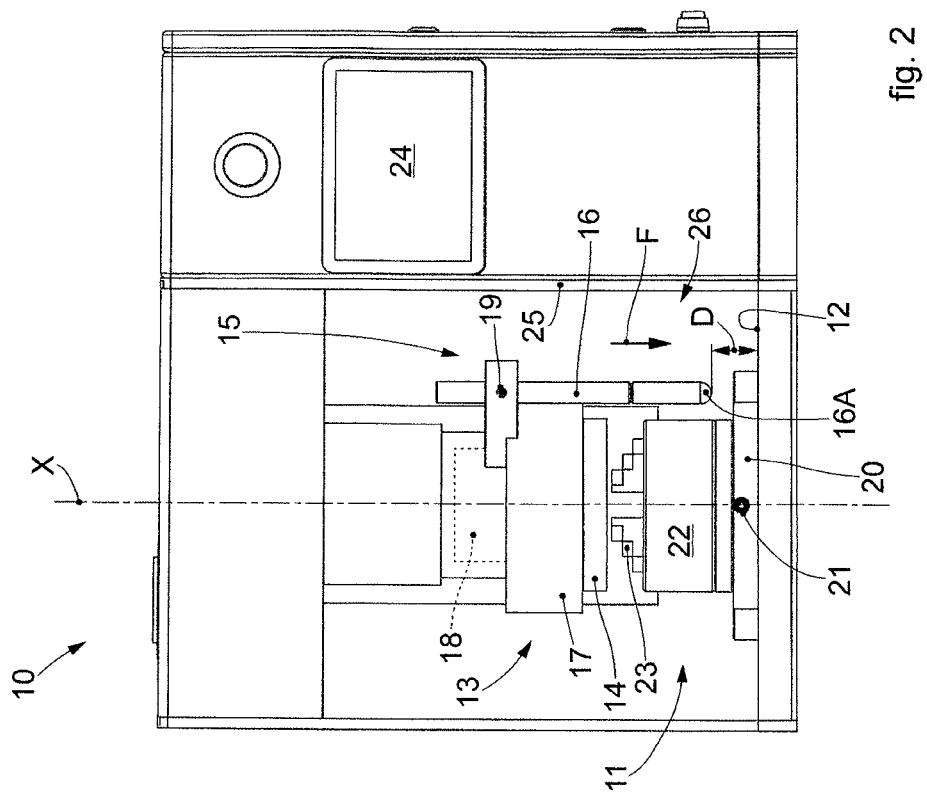
Figure 1:
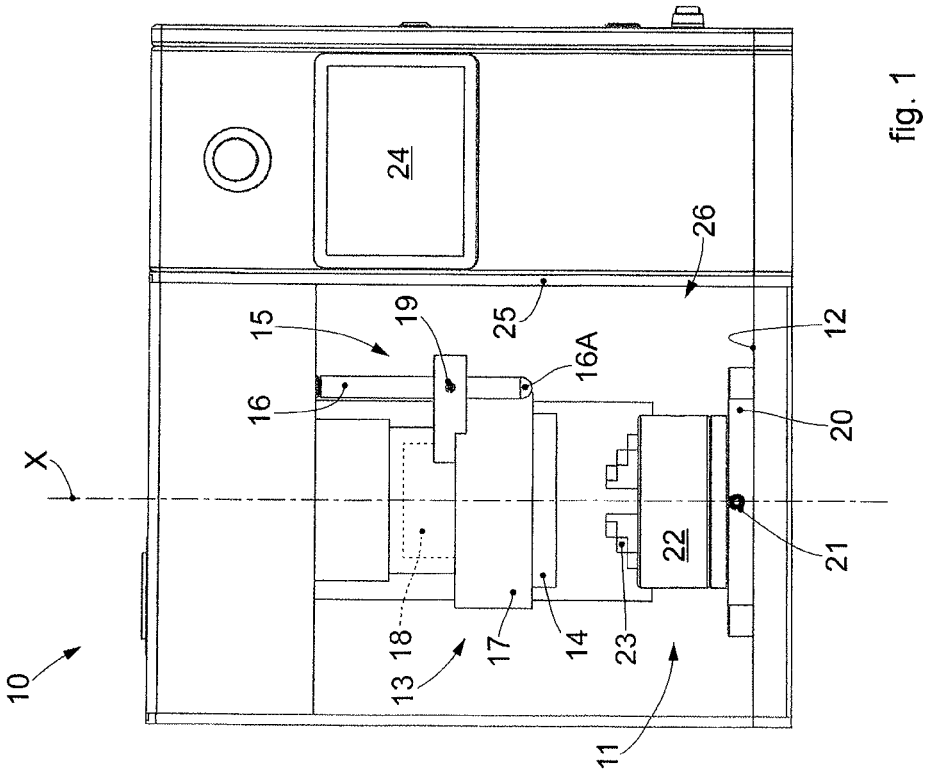
FIG. 1 is a schematic view in front elevation of a grinding machine according to the invention.

The adjustment means 15 are mobile parallel to the main axis of development X so as to be able to assume a position distanced by a predetermined distance D from the reference plane 12 (FIG. 2).

The adjustment means 15 comprise an oblong adjustment element 16, for example an adjustment rod, which extends in a direction parallel to the main axis of development X.

In some embodiments, the adjustment rod 16 is supported by the support body 17.

In some embodiments, the adjustment rod 16 is mobile with respect to the support body 17. In particular, the adjustment rod 16 can translate with respect to the support body 17.

In some embodiments, the operating unit 13 comprises clamping means 19 configured to alternately clamp or unclamp the position of the adjustment rod 16 with respect to the support body 17.

In some embodiments, the clamping means 19 are known in the state of the art and can for example comprise a screw acting on a stop element. By acting on the screw, the operator can take the stop element into contact with the adjustment rod 16 so as to clamp the position of the latter.

It should be noted that, in one embodiment, the displacement of the adjustment rod 16 can be operated manually by the operator.

In other embodiments, not shown, the adjustment means 15 can comprise a drive unit, of a known type, which moves the adjustment rod 16 in an automated manner.

The support unit 11 comprises abutment means 20 configured to abut on the adjustment rod 16. To this purpose, the adjustment rod 16 comprises a lower end portion 16A shaped in such a way as to define a localized contact zone between the adjustment rod 16 and the abutment means 20.

In some embodiments, the end portion 16A can have, for example, a hemispherical shape.

In other embodiments, the end portion 16A can have different shapes from the hemispherical shape, such as for example conical or truncated cone shape, with the top of the cone facing toward the abutment means 20.

In some embodiments, the adjustment element 16 can comprise at least one sensor, of a known type, configured to detect the contact between the end portion 16A and the abutment means 20. In particular, the sensor can be positioned in correspondence with the end portion 16A. The presence of the sensor allows to motorize the inclination movement of the support unit 11. For this purpose, an additional motor can be provided which drives the support unit 11 to take it into the inclined position and keep it clamped in this position.

In some embodiments, the abutment means 20 can be configured as a base on which the support unit 11 rests.

In some embodiments, a clamping device 21 can be associated with the abutment means 20, which is configured to selectively clamp the position of the support unit 11 once it has been inclined by the angle α.

During use, the support unit 11 is rotatable with a rotational motion around the axis of longitudinal development X.

In some embodiments, the support unit 11 can comprise a rotary table 22 and a tool-bearing mandrel 23, for example of the universal type.

The tool-bearing mandrel 23 is fixed to the rotary table 22 and the latter is connected to the abutment means 20.

The grinding machine 10 comprises a user interface 24 through which an operator can control its functioning. The user interface 24 is operatively connected to a control and management unit (not shown) of the grinding machine 10.

According to the invention, a method is also provided to grind tools 100, 100' using a grinding machine 10, for example like the one described above.

The method according to the invention comprises the steps of:

positioning on a support unit 11 a tool 100, 100' comprising a cutting portion 101, 101a, 101b having a certain angle of inclination θ with respect to the horizontal, introducing into a user interface 24 the value of an angle α, in which the angle α is equal to or different from the angle of inclination θ of the cutting portion 101, 101a, 101b, calculating a distance D between adjustment means 15, configured to adjust the inclination of the support unit 11, and a substantially horizontal reference plane 12; wherein the distance D is a linear distance corresponding univocally to the angle α, moving an operating unit 13 comprising abrasive means 14 toward the support unit 11 by a predetermined entity that is a function of the distance D, taking the adjustment means 15 to the distance D from the reference plane 12 (FIG. 2), inclining the support unit 11 by the angle α with respect to the reference plane 12 until the abutment means 20 comprised in the support unit 11 abut on an adjustment element 16, for example shaped like a rod or an oblong element, comprised in the adjustment means 15 (FIG. 3), distancing the adjustment means 15, in particular the adjustment element 16, from the reference plane 12 so that they do not obstruct the action of the abrasive means 14 (FIG. 4), grinding the tool 100, 100' using the abrasive means 14.

It should be noted that the distance D, in particular, is the distance between an end portion 16A of the adjustment element 16 and the reference plane 12.

The step of calculating the distance D provides to calculate the latter according to the angle α and the geometry of the support unit 11, in particular the radial distance between the main axis of development X and the point where the end portion 16A abuts on the abutment means 20.

Once the distance D has been calculated, the method provides the step of moving the operating unit 13 along the main axis of development X. To do this, the method provides to determine the entity of displacement of the operating unit 13 along the main axis of development X. The entity of this displacement is a function of the distance D calculated in the previous step.

The control and management unit of the grinding machine 10 is able to calculate the entity of displacement of the operating unit 13 based on the geometries and the spatial disposition of the operating unit 13, of the support unit 11 and of the adjustment means 15.

In some embodiments, once the distance D is known, to determine the displacement of the operating unit 13 it is sufficient to know the length of the adjustment rod 16, its maximum translation travel with respect to the support body 17, and the thickness of the abutment means 20, that is, the distance of the latter from the reference plane 12.

In some embodiments, in the method according to the invention the step of taking the adjustment means 15 to the distance D from the reference plane 12 comprises the step of acting on clamping means 19 to unclamp the position of the adjustment rod 16 with respect to a support body 17 comprised in the operating unit 13.

In this way, the adjustment rod 16 can move with respect to the support body 17 in a direction parallel to the main axis of development X, as indicated by the arrow F in FIG. 2. In particular, it is provided that the adjustment rod 16 moves as indicated by the arrow F until an end portion 16A of the adjustment rod 16 reaches said distance D from the reference plane 12.

It should be noted that, in some embodiments, the adjustment rod 16 can comprise a reference element, for example shaped like an annular ridge, which engages with a relative shoulder made on the support body 17. During use, when the operator unclamps the position of the adjustment rod 16 by acting on the clamping means 19, the adjustment rod 16 translates with respect to the support body 17, moving in the direction indicated by the arrow F, until the annular ridge abuts with the shoulder.

After the step of acting on the clamping means 19, the step of taking the adjustment means 15 to the distance D from the reference plane 12 provides to further act on the clamping means 19 to clamp the position of the adjustment rod 16 with respect to the support body 17.

It should be noted that, after the step of inclining the support unit 11, the latter is inclined with respect to the reference plane 12 by an angle α which has been previously set by the operator on the interface 24. The angle α can be substantially equal to the angle of inclination θ of the cutting portion 101, 101*a*, 101*b* of the tool 100 with respect to the horizontal. In this case, after the inclination step, the cutting portion 101*b* which has to be ground is substantially horizontal (and therefore parallel to the horizontal reference plane 12, as shown in FIG. 4) so that the abrasive means 14 can grind the cutting portion 101*b* in an optimum manner According to another aspect of the invention, a method is provided to command the functioning of a grinding machine for grinding tools 100, 100' which comprises the step of controlling the displacement of the operating unit 13 comprising abrasive means 14 with respect to the support unit 11 configured to support the tool to be ground.

In particular, the method provides to control the speed of displacement of the operating unit 13 along a main axis of development X of the grinding machine 10.

The method provides to detect the force exerted on the tool by the abrasive means 14 and to command the advance of the operating unit 13 in the direction indicated by the arrow F as a function of the force value detected. In particular, the step of detecting the force comprises the step of detecting the current absorbed by drive means 18 comprised in the grinding machine 10. The drive means 18 are configured to command the displacement of the operating unit 13 along the main axis of development X and/or the rotation movement of the abrasive means 14 around the main axis of development X. In particular, the drive means 18 command the displacement along the main axis of development X of a support body 17 comprised in the operating unit 13 to which the abrasive means 14 are connected.

After the step of detecting the current, it is provided to compare the current values detected with at least one predetermined threshold value.

After the comparison step, in one embodiment it is provided to decrease, or annul, the speed of advance of the support body 17 and/or the rotation speed of the abrasive means 14 if the current values detected are higher than the threshold value.

After the comparison step, in another embodiment it is provided to stop the translation of the support body 17 and/or the rotation of the abrasive means 14.

After the comparison step, in other embodiments it is provided to move the support body 17 with a speed of advance oriented in a direction opposite to that indicated by the arrow F, so that the operating unit 13 moves away from the support unit 11 by a certain distance.

It is clear that modifications and/or additions of parts or steps may be made to the machine and method as described heretofore, without departing from the field and scope of the present invention.

It is also clear that, although the present invention has been described with reference to some specific examples, a person of skill in the art shall certainly be able to achieve many other equivalent fauns of machines and methods, having the characteristics as set forth in the claims and hence all coming within the field of protection defined thereby.

The invention claimed is:

1. A grinding machine for grinding a tool, the grinding machine comprising:
   a support unit configured to support the tool to be ground and located on a horizontal reference plane, said support unit comprising members configured to incline said support unit by an angle with respect to the horizontal reference plane;
   an operating unit comprising an abrasive assembly configured to abrade at least a portion of the tool to be ground, said operating unit being movable along a main axis of development of said grinding machine, perpendicular to the horizontal reference plane, in order to move nearer to or farther away from said support unit and with respect to said support unit; and
   an adjustment system comprising at least one adjustment element to adjust an inclination of said support unit with respect to the horizontal reference plane, wherein
   said support unit further comprises an abutment element configured to abut on said at least one adjustment element, said at least one adjustment element being connected to said operating unit and extending in a direction parallel to the main axis of development,
   said at least one adjustment element further comprises a lower end portion shaped so as to define a localized contact zone between said at least one adjustment element and said abutment element and is movable parallel to the main axis of development to assume at least an adjustment position disposed at a distance from the horizontal reference plane, and
   the distance is a linear distance between said lower end portion of said at least one adjustment element and the horizontal reference plane and corresponds univocally to the angle.

2. The grinding machine as recited in claim 1, wherein said operating unit further comprises a support body that supports at least one of said abrasive assembly or said at least one adjustment element, and a drive system configured to command at least one of movement of said support body along the main axis of development or rotational movement of said abrasive assembly around the main axis of development.

3. The grinding machine as recited in claim 2, wherein said at least one adjustment element is movable with respect to said support body.

4. The grinding machine as recited in claim 2, wherein said operating unit further comprises a clamping device configured to alternately clamp or release a position of said at least one adjustment element with respect to said support body.

5. The grinding machine as recited in claim 1, wherein the main axis of development extends in a vertical direction that is perpendicular to the horizontal reference plane.

6. A method for grinding a tool using a grinding machine, the method comprising the steps of:
   positioning a tool on a support unit of the grinding machine, the support unit being located on a horizontal reference plane, the tool having a cutting portion inclined by a certain angle of inclination with respect to the horizontal reference plane, and the support unit comprising members configured to incline the support unit with respect to the horizontal reference plane;

introducing in a user interface associated with the grinding machine a value of an introduced angle, the introduced angle being equal to or different from the angle of inclination of the cutting portion;

calculating a distance between an adjustment system of the grinding machine and the horizontal reference plane of the grinding machine, the distance being a linear distance corresponding univocally to the introduced angle, and the adjustment system comprising at least one adjustment element to adjust the inclination of the support unit, with respect to the horizontal reference plane, to the introduced angle;

moving an operating unit of the grinding machine that comprises an abrasive assembly along a main axis of development of the grinding machine, perpendicular to the horizontal reference plane, towards the support unit that supports the tool by a predetermined quantity which is a function of the distance;

taking the adjustment system to the distance from the horizontal reference plane;

inclining the support unit by the introduced angle with respect to the horizontal reference plane until an abutment element of the support unit abuts on the at least one adjustment element of the adjustment system, the at least one adjustment element being associated with the operating unit, extending in a direction parallel to the main axis of development, the at least one adjustment element comprising a lower end portion shaped so as to define a localized contact zone between the at least one adjustment element and the abutment element, and being movable parallel to the main axis of development to assume at least an adjustment position disposed at the distance from the horizontal reference plane, the distance being the linear distance that is both corresponding univocally to the introduced angle and the linear distance between the lower end portion and the horizonal reference plane;

distancing the adjustment system from the horizontal reference plane so that operation of the abrasive assembly is not obstructed by the adiustment system; and grinding the tool by using the abrasive assembly.

7. The method as recited in claim 6, further comprising:

before said taking of the adjustment system, acting on a clamping device to release a position of the at least one adjustment element with respect to a support body of the operating unit so that the at least one adjustment element can move in the direction parallel to the main axis of development with respect to the support body until the lower end portion of the at least one adjustment element reaches the distance from the horizontal reference plane; and after said taking of the adjustment system, acting further on the clamping device to clamp the position of the at least one adjustment element with respect to the support body.

* * * * *